United States Patent [19]

Suzuki

[11] 4,415,451
[45] Nov. 15, 1983

[54] PROCESS FOR WASTE WATER DISPOSAL

[75] Inventor: Hisashi Suzuki, Akishima, Japan

[73] Assignee: Iseki & Co., Ltd., Matsuyama, Japan

[21] Appl. No.: 296,127

[22] Filed: Aug. 25, 1981

Related U.S. Application Data

[63] Continuation of Ser. No. 122,197, Feb. 19, 1980, abandoned.

[51] Int. Cl.$^3$ .............................................. C02F 3/08
[52] U.S. Cl. ................................. 210/610; 210/616; 210/150
[58] Field of Search ................................ 210/616–618, 210/150, 151, 195.3, 197, 199, 220, 610

[56] References Cited

U.S. PATENT DOCUMENTS

| | | | |
|---|---|---|---|
| 2,212,841 | 8/1940 | Maxwell | 210/199 |
| 3,058,908 | 10/1962 | Morgan | 210/220 |
| 3,300,403 | 1/1967 | Kehoe | 210/616 |
| 3,339,741 | 9/1967 | Bernard et al. | 210/195.4 |
| 3,694,353 | 9/1972 | Yang et al. | 210/197 |
| 3,803,029 | 4/1974 | Blecharczyk | 210/617 |
| 3,805,957 | 4/1974 | Oldham et al. | 210/220 |
| 3,904,518 | 9/1975 | Hutton et al. | 210/616 |
| 3,980,556 | 9/1976 | Besik | 210/616 |
| 4,009,098 | 2/1977 | Jeris | 210/618 |
| 4,066,722 | 1/1978 | Pietruszewski et al. | 210/220 |

FOREIGN PATENT DOCUMENTS 44-5949  3/1969  Japan .................................. 210/616

OTHER PUBLICATIONS

Adams A. D., "Improving Activated Sludge Treatment with Powdered Activated Carbon", Proc. of the 28th Ind. Waste Conf. Purdue Univ., (May 1973).

Primary Examiner—Benoît Castel
Attorney, Agent, or Firm—Frishauf, Holtz, Goodman & Woodward

[57] ABSTRACT

A process for waste water disposal is herein disclosed, in which waste water of high BOD concentration is subjected to an aeration treatment in an aeration vessel so as to reduce the BOD concentration thereof by circulating within said aeration vessel a quantity of coal or active carbon of which 80% or higher is of particle size between 2 and 5 mm and less than 50% is of particle size difference within a range of 0 to 0.5 mm, and microorganisms implanted thereon. Said aeration vessel is adapted for effective disposal of waste water of high BOD concentration without any requirement of water dilution and comprises a pair of long side walls, a pair of short side walls, a bottom wall defined by these pairs of side walls, an upper opening, wherein a lower portion of one long side wall is at an angle of 45° to 60° with respect to the horizontal, and a plurality of air blower pipes provided along the inner surface of the other long side wall adjacent said bottom wall.

5 Claims, 4 Drawing Figures

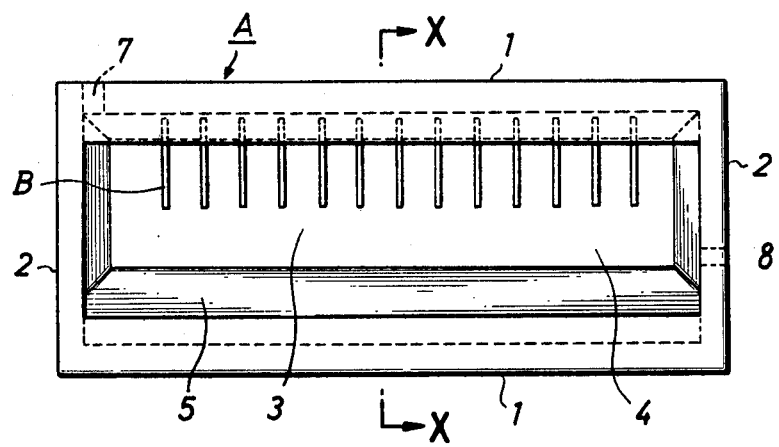
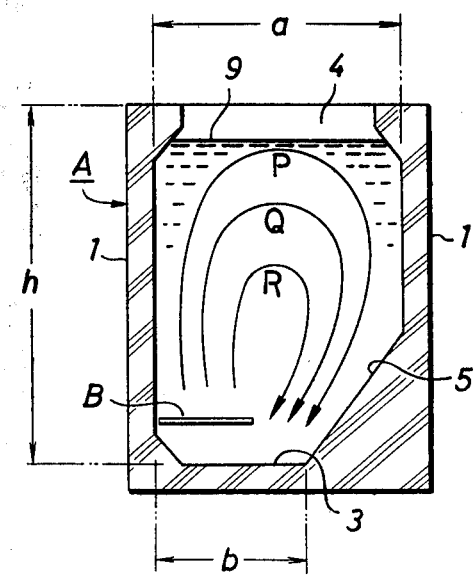

PROCESS FOR WASTE WATER DISPOSAL

This is a continuation of application Ser. No. 122,197 filed Feb. 19, 1980, and now abandoned.

FIELD OF THE INVENTION

The present invention relates to a process for waste water disposal and an arrangement of aeration vessel in an equipment for such waste water disposal. More particularly, the invention relates to a process for waste water disposal in which waste water of high BOD concentration is subjected to aeration in an aeration vessel so as to reduce the BOD concentration and an arrangement of said aeration vessel in equipment used for execution of such process.

DESCRIPTION OF THE PRIOR ART

Waste water discharged from various plants is to be treated for prevention of environmental pollution so that the BOD concentration is reduced to a level lower than a predetermined value and various processes for waste water disposal have been executed depending upon the types of waste water.

The activated sludge method is a typical process for waste water disposal which has presently been employed as the optimal process for disposal of waste water being high in content of organic matters as well as in BOD concentration, such as waste water discharged from various food processing plants.

With this activated sludge method of the prior art, however, direct treatment of waste water of BOD concentration as high as 3000 ppm or higher and such waste water of high BOD concentration has usually been water diluted to reduce the BOD concentration to a suitable level before subjected to the activated sludge method. This means an extra cost required for disposal.

Furthermore, the activated sludge method of the prior art includes a precaution to obtain extremely uniform circulation of waste water in the aeration vessel for improved efficiency of disposal. Also in the conventional process in which a quantity of active carbon is circulated within the aeration vessel, special measures have usually been employed to obtain uniform distribution and circulation of active carbon within the aeration vessel, such as using active carbon of extremely small particle size, for example, smaller than 2 mm, or of particle size as uniform as possible, a quantity of active carbon of which 95% or higher has particle size difference within a range from 0 to 0.5 mm.

Although various processes for waste water disposal other than said activated sludge method have already been developed, none of them has proved to be a practically useful process for effective disposal of waste water of high BOD concentration, and accordingly there has been a serious demand for such useful process for waste water disposal.

BRIEF SUMMARY OF THE INVENTION

An object of the present invention is to provide a process for waste water disposal particularly adapted for effective disposal of waste water of high BOD concentration without any requirement of water dilution.

Another object of the present invention is to provide an aeration vessel in an equipment for execution of said process.

The present invention is based on knowledge that it is possible for waste water of BOD concentration so high that the activated sludge method of prior art has never been able to treat it at all, to be directly treated at an extremely high efficiency when the aeration treatment of waste water (decomposition of organic matters contained in waste water) in the aeration vessel (decomposition vessel) according to the activated sludge method of prior art is carried out while a quantity of coal or activated carbon having a special distribution of particle sizes and microorganisms implanted thereon is circulated within the aeration vessel.

It has also been found that waste water of high BOD concentration can be more effectively converted to clean water of extremely low BOD concentration particularly when the coal particles on which the microorganisms have previously been implanted in a special manner at the exterior of said vessel is used.

It has further been found that said effect is achieved when a quantity of oxygen to be dissolved into waste water within the aeration vessel during the waste water disposal process is substantially larger than that in the activated sludge method of prior art.

It has still further been found that said effect is reliably achieved when the aeration vessel used for execution of said waste water disposal process is of a special arrangement.

The present invention based on the above-mentioned knowledge thus provides a process for waste water disposal in which waste water of high BOD concentration is subjected to an aeration treatment in an aeration vessel so as to reduce the BOD concentration thereof, characterized by circulating within said aeration vessel a quantity of coal (except peat, and pitch and smokeless coal having a carbon content of 84% or higher) or active carbon of which at least 80% is of particle size between 2 and 5 mm and less than 50% is of particle size difference within a range of 0 to 0.5 mm, and microorganisms implanted thereon.

Said process for waste water disposal according to the present invention enables waste water of a BOD concentration so high that the process of prior art has never been able to treat satisfactorily to be directly treated without any requirement of water dilution thereof so as to reduce the BOD concentration to a desired level.

It should be understood that the expression "possibility of waste water disposal" in the previous and following description means "possibility of reducing waste water BOD concentration on an industrial scale and with a practical efficiency to the level at which waste water is permitted to be discharged under the related regulations".

BRIEF DESCRIPTION OF THE DRAWINGS

FIG. 1 is a plan view showing an embodiment of the aeration vessel according to the present invention;

FIG. 2 is a cross section taken along a line X—X in FIG. 1;

DETAILED DESCRIPTION

Figure 3:
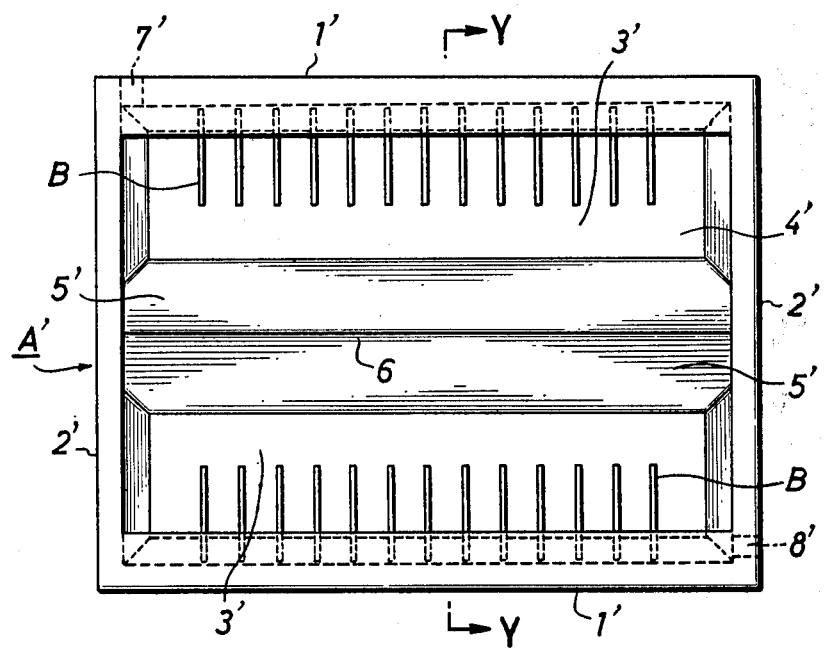
FIG. 3 is a plan view showing another embodiment of the aeration vessel according to the present invention.

The process for waste water disposal according to the present invention is not limited to a few particular types of waste water but is applicable to various types of waste water such as those derived from bean jam production, miso brewing, sea food processing and pig breeding. The process according to the present invention enables waste water of high BOD concentration, i.e., lying between 3000 and 100,000 ppm to be treated without any requirement for water dilution. Although it is obvious that the present invention is applicable also to waste water of low BOD concentration, the present invention is particularly effective for waste water of high BOD cocentration which has never satisfactorily treated by the conventional processes, since waste water of said low BOD concentration (200 to 1000 ppm) can be effectively treated also by the activated sludge method of prior art.

According to the present invention, a quantity of coal to be circulated within the aeration vessel has a particle size distribution such that at least 80% and preferably 90% or higher of the quantity is of particle sizes lying between 2 and 5 mm while a particle size differences of 0 to 0.5 mm is established in at the most 50% of the quantity. When the proportion of particles having sizes smaller than 2 mm exceeds 20% or the proportion of paticles having size differences lying within the range of 0 to 0.5 mm, i.e., having a substantially uniform size, exceeds 30%, the desirable distribution of particle size is not obtained and, accordingly, it becomes difficult to maintain a uniform circulation of coal particles within the aeration vessel, resulting in that the object of the present invention can not be achieved.

In view of the fact that said coal is provided with microorganism implanted thereon, the coal particles principally comprising peat, or pitch or smokeless coal having a carbon content of 84% or higher are not suitable for use in the present invention, since the coal particles of the first-mentioned type are too poor in their strength and those of the second-mentioned type prevent said microorganisms from being easily implanted thereon. Instead of these types as above mentioned, particles of brown coal or lignite are used in the present invention, and the implantation of microorganisms is preferably carried out at the exterior of the aeration vessel, preferably in such a manner that a group of microorganism including alcohol fermentation organisms are implanted on the particles. In a preferred embodiment of such implantation, 100 parts by weight of coal having a particle size distribution concentrated within a range of 0.2 to 20 mm are mixed with 10 to 80 parts by weight of nutrients containing a large quantity of proteinaceus substances such as rice bran and oil cake together with phosphorus and potassium so that a moisture content of 40 to 60% may be present therein and this resultant mixture is then subjected to fermentation. The coal particles thus provided with the microorganism implanted thereon may be then blended so as to obtain a desired distribution of particle sizes depending upon a particular application. In the case where active coal is used, a suitable quantity of active coal may be charged into the aeration vessel together with sludge in a necessary quantity for serving as MLSS and, as a result, the microorganisms are implanted on the particles of active coal in the aeration vessel.

The process according to the present invention in which, as mentioned above, a quantity of coal or activated carbon having a specified distribution of particle sizes and microorganisms implanted thereon circulates within the aeration vessel is similar to the activated sludge process of prior art in that the waste water to be treated is introduced via the slit screening vessel and the raw water reservoir into the aeration vessel. However, the process according to the present invention is distinguished from the process of prior art in that even waste water of a BOD concentration as high as of 3000 to 100000 ppm can be directly introduced into the aeration vessel and treated at a high load (3 to 30 Kg BOD/m$^3$ per day), compared to the process of prior art in which the introduction of waste water into the aeration vessel occurs after water dilution when the BOD concentration is relatively high.

The quantity of said coal particles to be circulated through a quantity of waste water to be treated which has been introduced into the aeration vessel, although it depends upon the type of waste water, may be normally 5 to 25 Kg/m$^3$ (aeration vessel), preferably 10 to 20 Kg/m$^3$, and increased as the BOD concentration increases. Furthermore, it is preferred to use the coal particles having such a size distribution that a proportion of relatively large size particles increases as the BOD concentration of waste water to be treated increases.

Aeration treatment in the aeration vessel is accomplished by air introduction through air blower pipes into a mass of waste water and thereby circulating the mass of waste water together with said coal particles. The quantity of air to be introduced may be selected depending upon factors such as the type of waste water so that the quantity of oxygen dissolved in the mass of waste water to be treated corresponds to 2 to 7 ppm, preferably 3 to 5 ppm.

Now preferred embodiments of the aeration vessel used in execution of the process according to the present invention will be described in reference with the accompanying drawing.

A first embodiment shown by FIGS. 1 and 2 comprises a vessel body A and air blower pipes B, said vessel body A comprising a pair of long side walls 1, 1, a pair of short side walls 2, 2, a bottom wall 3 defined by said two pairs of side walls, and an upper opening 4. A lower portion of one long side wall 1 defines an oblique wall 5 is at an angle of 45° to 60° with respect to the bottom wall 3 so that a relationship of b/a=0.5 to 0.8 is established between the inner distances a and b across said pair of long side walls 1, 1 adjacent said opening 4 of the vessel body A and adjacent said bottom wall 3, respectively. The air blower pipes B are arranged in plurality along the inner surface of the other long side wall 1 adjacent the bottom wall 3. A relationship of a/h=0.4 to 0.8 is established between the height h of the inner walls of the vessel body A and said distance a.

Figure 4:
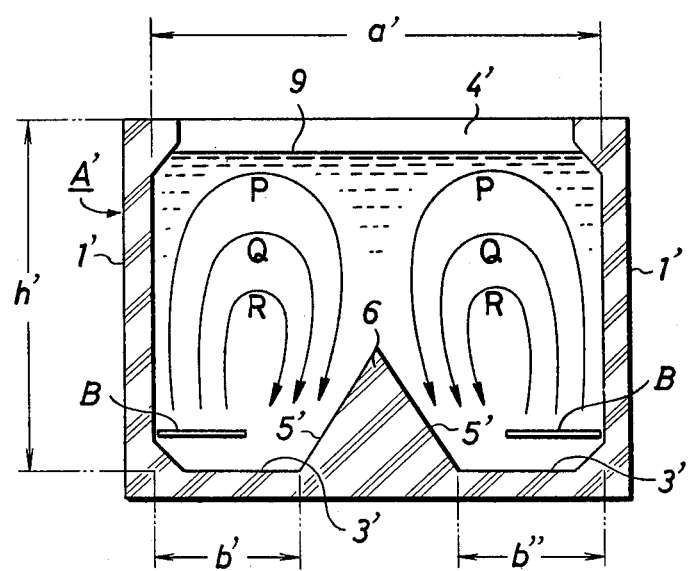
FIG. 4 is a cross section taken along a line Y—Y in FIG. 3.

A second embodiment shown by FIGS. 3 and 4 comprises a vessel body A' consisting of a pair of the vessel bodies A as shown by FIGS. 1 and 2 with the respective long side walls 1 including the oblique walls 5 being cleared away except said oblique walls. Thus, arrangement of the vessel body A' is similar to that as shown by FIGS. 1 and 2 except that a distance a' across a pair of long side walls 1', 1' adjacent an upper opening 4' corresponding to 2a, an angular body 6 for control of circulation is defined by a pair of oblique walls 5', 5', and relationships of 2b'/a'=0.5 to 0.8, 2b''/a'=0.5 to 0.8 and a'/2h'=0.4 to 0.8 are established. In this embodiment, air blower pipes B are arranged along respective inner surfaces of both long side walls 1', 1' in plurality, respectively, adjacent the bottom walls.

Values of b/a, 2b'/a', 2b''/a' and angles of the oblique walls 5, 5' have been specified as mentioned above in the vessel bodies A, A' according to the present invention in order to obtain a smooth circulation of coal particles within the vessel bodies A, A' depending upon the distribution of particle sizes.

In both embodiments, the air blower pipes B are designed and located so that air bubbles supplied through the respective air blower pipes move directly upward, but such design and location are not particularly limited. However, it is preferred to arrange the air blower pipes B, B perpendicularly to the long side walls 1, 1' and especially to employ those of H-configuration. Reference numeral 7, 7' designate inlets through which waste water is introduced from the raw water reservoir (not shown) into the vessel bodies A, A' while reference numeral 8, 8' designate inlets through which said waste water is introduced from the vessel bodies A, A' into a separator vessel (not shown). Reference numeral 9 designates water top.

The aeration vessel according to the present invention is of such arrangement as mentioned hereinabove, so that, when the aeration treatment according to the present invention is carried out using said vessel body A or A', the object of the invention is more effectively achieved, since the portion of coal particles having relatively small sizes circulates in the direction indicated by arrows P and the rest in the directions Q, R as the particle sizes increases.

It should be understood that the mass of waste water having its BOD concentration previously reduced by the aeration treatment (decomposition treatment) in the process according to the present invention may be subjected to the decomposition treatment in the usual activated sludge process, if necessary, and the aeration treatment according to the present invention enables so-called surplus sludge which has conventionally been treated in a separate surplus sludge vessel to be recycled into the aeration vessel according to the present invention, in which said surplus sludge can be treated.

Examples of the process according to the present invention and an example of preparing a mass of coal including micro-organism implanted thereon suitable for execution of said process will be now described. It should be noted here that the present invention is never limited to those examples.

EXAMPLE OF PREPARATION

A mixture of 3 Kg of lignite having a substantially uniform particle size distribution within a range of 0.2 mm to 10 mm, 1 Kg of rice bran and 1.5 Kg of water is charged at a normal temperature (20° to 35° C.) into a container so that a ratio of 0.8 Kg/l is established within the container. Fermentation begins 24 hours after and water evaporation is promoted. Considering such phenomena, water is sprayed everyday onto the mixture surface with stirring so that a central portion of the mixture is maintained at a temperature of $50\pm2°$ C. until the fermentation is completed in 7 days from initiation of fermentation. The completion of fermentating corresponds here to a time point at which substances somewhat like white mold begins to enter the interior of each particle and thereby to destroy the particle.

EXAMPLES OF TREATMENT

Following Tables 1 and 2 indicate conditions under which waste water of BOD 3000 ppm derived from miso brewing and waste water of BOD 9000 ppm derived from sea food processing were treated and results of these treatments. Comparative examples correspond to the cases utilizing the activated sludge process of the prior art.

TABLE 1

|  | Example 1 | Reference 1 | Reference 2 |
| --- | --- | --- | --- |
| Waste water | From miso brewing | From miso brewing | From miso brewing |
| BOD load | 3 KgBOD/m³ daily | 1 KgBOD/m³ daily | 1 KgBOD/m³ daily |
| Air quantity | 52 Nm³/min | 65 Nm³/min | 19 Nm³/min |
| Diluent water quantity | 0 | 1000 m³/day | 1000 m³/day |
| Aeration vessel | 500 m³ | 1500 m³ | 1500 m³ |
| Installation area | 280 m² × 5 mH | 500 m² × 5 mH | 85 m² × 18 mH + 200 m² × 4 mH |
| BOD after disposal | 10 ppm | 30 ppm | 20 ppm |
| SS after disposal | 20 ppm | 50 ppm | 50 ppm |
| Surplus sludge | 3 m³/day | 50 m³/day | 25 m³/day |
| Maintenance | 0.1 human labor/day | 1 human labor/day | 1 human labor/day |

In Example 1, the coal particles having microorganism implanted thereon prepared in the manner as mentioned according to said Example of preparation, with those from which particles of sizes 5 mm or larger were removed were used in a quantity of 10 Kg/m³.

| Reference 1 | Blue Bond type. |
| --- | --- |
| Reference 2 | Depth aeration type. |

TABLE 2

|  | Example 2 | Reference 3 | Reference 4 |
| --- | --- | --- | --- |
| Waste water | From sea food processing | From sea food processing | From sea food processing |
| BOD load | 9 KgBOD/m³ daily | 1 KgBOD/m³ daily | 1 KgBOD/m³ daily |
| Air quantity | 47 Nm³/min | 59 Nm³/min | 18 Nm³/min |
| Diluent water quantity | 0 | 1200 m³/day | 1200 m³/day |
| Aeration vessel | 150 m³ | 1350 m³ | 1350 m³ |
| Installation area | 70 m² × 5 mH | 400 m² × 5 mH | 75 m² × 18 mH + 100 m² × 5 mH |
| BOD after treatment | 60 ppm | 60 ppm | 60 ppm |
| SS after treatment | 90 ppm | 90 ppm | 90 ppm |
| Surplus sludge | 14 m³/day | 56 m³/day | 39 m³/day |
| Maintenance | 0.2 human labor/day | 1.5 human labor/day | 1.5 human labor/day |

In Example 2, the coal particles used in Example 1 were used in proportion of 15 kg/m³.

| Reference 3 | Blue Bond type. |
| Reference 4 | Depth aeration type. |

SUPPLEMENTARY EXAMPLES

Waste water of various types were treated under various conditions and results as set forth in Table 3 were obtained. In these Examples, the coal particles used in the previous Examples were used in the proportion of 20 Kg/m³.

TABLE 3

| | | Waste water | | | BOD load | | Treated water | | |
|---|---|---|---|---|---|---|---|---|---|
| No. | Origin | Water m³/D | BOD ppm | SS ppm | Kg/m³D | Air Nm³/min | Aer. Vessel m³ | BOD ppm | SS ppm |
| 1 | Bean jam preparation | 200 | 4,000 | 1,500 | 4 | 15 | 200 | 5 | 10 |
| 2 | Miso brewing | 400 | 3,500 | 2,000 | 4.7 | 30 | 300 | 10 | 15 |
| 3 | Miso brewing | 300 | 6,000 | 1,700 | 6 | 34 | 300 | 3 | 5 |
| 4 | Steaming-boiling of fish | 12 | 72,000 | 28,000 | 72 | 19 | 12 | 100 | 120 |
| 5 | Fish meat processing | 52 | 10,500 | 6,000 | 10 | 12 | 53 | 25 | 30 |
| 6 | Sea food canning | 150 | 28,000 | 1,500 | 28 | 80 | 150 | 50 | 80 |
| 7 | Greenstuff canning | 100 | 3,500 | 2,800 | 3.5 | 73 | 100 | 3 | 15 |
| 8 | Orange canning | 2500 | 2,000 | 3,900 | 3 | 94 | 1700 | 10 | 15 |
| 9 | Beet refining | 10 | 10,000 | 650 | 10 | 3 | 10 | 10 | 5 |
| 10 | Starch preparation | 30 | 3,400 | 2,300 | 3.4 | 3 | 30 | 5 | 20 |
| 11 | Butanol distillation | 150 | 6,100 | 80 | .5 | 19 | 180 | 10 | 15 |
| 12 | Alcohol preparation | 150 | 19,000 | 4,500 | 19 | 53 | 150 | 50 | 30 |
| 13 | Fermentation | 50 | 13,000 | 800 | 13 | 14 | 50 | 10 | 20 |
| 14 | Confectionery | 150 | 12,600 | 2,900 | 12 | 42 | 150 | 15 | 20 |
| 15 | Drug manufacture | 5 | 40,000 | 12,000 | 10 | 4 | 20 | 40 | 30 |
| 16 | Wool washing | 110 | 3,500 | 12,000 | 3.5 | 8 | 110 | 15 | 30 |
| 17 | Meat cooking | 90 | 8,000 | 2,500 | 8 | 16 | 90 | 80 | 40 |
| 18 | Coke oven | 30 | 5,800 | 4,300 | 6 | 4 | 29 | 10 | 20 |
| 19 | Paper making | 1000 | 3,500 | 800 | 3 | 66 | 1170 | 15 | 30 |
| 20 | Paper making | 130 | 19,300 | 130 | 19.3 | 53 | 130 | 100 | 80 |
| 21 | Butchery | 140 | 1,900 | 2,600 | 3 | 6 | 90 | 20 | 40 |
| 22 | Pig breeding | 10 | 6,000 | 13,000 | 6 | 2 | 10 | 30 | 50 |
| 23 | Pig breeding | 120 | 7,000 | 11,000 | 7 | 16 | 120 | 5 | 5 |
| 24 | Cowhouse | 2 | 36,000 | 58,000 | 36 | 2 | 2 | 120 | 150 |
| 25 | Cowhouse | 6 | 11,000 | 18,000 | 11 | 2 | 6 | 50 | 80 |
| 26 | Human waste | 10 | 10,000 | 13,500 | 10 | 2 | 30 | 50 | 60 |

As will be obviously seen from the aforegoing description, the process for waste water disposal according to the present invention is based on a technical contemplation quite different from the processes or methods of prior art and enables waste water of high BOD concentration which has never been directly treated by the processes or methods of the prior art to be directly treated. Additionally, production of surplus sludge is effectively reduced and a mass of waste water can be effectively and directly treated having a high starting BOD load in accordance with the present invention, so that a larger quantity of waste water can be effectively treated per unit time in comparison with the processes or methods of the prior art and thereby running cost of waste water disposal can be drastically reduced. These advantages of the present invention together with an easiness of installation maintenance provide and support a remarkable effect for the related industries.

What is claimed is:

1. A process for waste water disposal wherein waste water of high BOD concentration of from 3,000 to 100,000 ppm is aerated in an aeration vessel having a BOD load of from 3 to 30 Kg/m³ (of aeration vessel) per day so as to reduce the BOD concentration thereof, comprising a first step of implanting micro-organisms comprising alcohol fermentation organisms on coal particles (except peat, and pitch and smokeless coal having a carbon content of 84% or higher) of which at least 90% are of a particle size between 2 and 5 mm and not more than 50% are of particle size difference which is within the range of 0 to 0.5 mm by mixing said coal particles with a proteinaceous substance in the presence of moisture, and fermenting to implant said microorganisms on said coal particles outside of said aeration vessel, said coal particles being selected from the group consisting of brown coal and lignite, and then introducing and circulating said micro-organism implanted coal particles in an amount of 5 to 25 Kg/m³ (of aeration vessel) within said aeration vessel in contact with said waste water, to treat said waste water, and introducing air into said aeration vessel containing said waste water in an amount sufficient to maintain between 2 and 7 ppm of dissolved oxygen in said waste water, to treat said waste water and greatly reduce the BOD concentration, and removing said treated waste water from said aeration vessel which contains said circulating microorganism implanted coal particles.

2. The process for waste water disposal according to claim 1, wherein a quantity of air is introduced into said aeration vessel at such a rate that the quantity of oxygen dissolved in the quantity of waste water is maintained at 3 to 15 ppm.

3. The process for waste water disposal according to claim 1, wherein said coal particles are used in proportion of 10 to 20 Kg/m³ (aeration vessel).

4. The process for waste water disposal according to claim 1, wherein the higher the BOD concentration of waste water being treated, the higher the proportion of coal having relatively large particle sizes.

5. The process of any of claims 1, 2, or 3, wherein said microorganisms are implanted on said coal particles in the presence of a proteinaceous substance selected from the group consisting of rice bran and oil cake.

* * * * *